US011888203B2

(12) United States Patent
Uemichi

(10) Patent No.: US 11,888,203 B2
(45) Date of Patent: Jan. 30, 2024

(54) FILTER DEVICE

(71) Applicant: FUJIKURA LTD., Tokyo (JP)

(72) Inventor: Yusuke Uemichi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 320 days.

(21) Appl. No.: 17/606,544

(22) PCT Filed: Apr. 27, 2020

(86) PCT No.: PCT/JP2020/017877
§ 371 (c)(1),
(2) Date: Oct. 26, 2021

(87) PCT Pub. No.: WO2020/230598
PCT Pub. Date: Nov. 19, 2020

(65) Prior Publication Data

US 2022/0209382 A1 Jun. 30, 2022

(30) Foreign Application Priority Data

May 10, 2019 (JP) ................................ 2019-090145

(51) Int. Cl.
*H01P 1/208* (2006.01)
*H01P 1/20* (2006.01)
*H01P 3/12* (2006.01)

(52) U.S. Cl.
CPC .......... *H01P 1/2088* (2013.01); *H01P 1/2002* (2013.01); *H01P 3/121* (2013.01)

(58) Field of Classification Search
CPC ...... H01P 1/208; H01P 1/2002; H01P 1/2088; H01P 3/12
See application file for complete search history.

(56) References Cited

U.S. PATENT DOCUMENTS 9,741,521 B1 * 8/2017 Perkins .................... H01J 25/11
2016/0126637 A1 * 5/2016 Uemichi ............ H01Q 21/0043 343/771
2021/0167483 A1 * 6/2021 Wu ....................... H01P 1/2088

FOREIGN PATENT DOCUMENTS

CN 2877052 Y 3/2007
CN 105048051 A 11/2015
(Continued)

OTHER PUBLICATIONS

International Preliminary Report on Patentability (Form PCT/IB/373) issued in counterpart International Application No. PCT/JP2020/017877 dated Nov. 16, 2021, with English Translation and original of Written Opinion Form PCT/ISA/237. (7 pages).
(Continued)

*Primary Examiner* — Patrick C Chen
(74) *Attorney, Agent, or Firm* — WHDA, LLP

(57) ABSTRACT

A filter device having desired characteristics is easily designed. The filter device includes a post-wall waveguide functioning as a resonator group including five congruent resonators ($R_1$ to $R_5$). The resonators ($R_1$, $R_2$) include therein respective control posts ($CP_1$, $CP_2$), and a shortest distance ($d_i$) from the control post ($CP_i$) to a narrow wall of the resonator ($R_i$) satisfies $d_1>d_2$. The resonators ($R_4$, $R_5$) include therein respective control posts ($CP_4$, $CP_5$), and a shortest distance ($d_j$) from the control post ($CP_j$) to a narrow wall of the resonator ($R_j$) satisfies $d_4<d_5$.

15 Claims, 4 Drawing Sheets

(56) References Cited

FOREIGN PATENT DOCUMENTS

| | | | | | |
|---|---|---|---|---|---|
| CN | 108450609 | A | | 2/2017 | |
| JP | H11-284409 | A | | 10/1999 | |
| JP | 6312910 | B1 | * | 4/2018 | ............ H01P 1/2002 |
| JP | 6312910 | B1 | | 4/2018 | |
| JP | 2018-182493 | A | | 11/2018 | |
| JP | 2018-191267 | A | | 11/2018 | |
| WO | 2009/116934 | A1 | | 9/2009 | |

OTHER PUBLICATIONS

International Search Report dated Jul. 21, 2020, issued in counterpart Application No. PCT/JP2020/017877. (2 pages).

* cited by examiner

FILTER DEVICE

TECHNICAL FIELD

The present invention relates to a resonator-coupled filter device.

BACKGROUND ART

Band-pass filter devices designed for use in microwave and millimeter-wave bands are disclosed in, for example, Patent Literature 1. The band-pass filter devices are an aspect of a filter device.

These filter devices are provided by utilizing a post-wall waveguide (PWW) technique. Specifically, these filter devices are produced by using a dielectric substrate which is sandwiched between a pair of conductor layers. The substrate includes therein a plurality of resonators which are coupled together. The plurality of resonators each include: a pair of broad walls which is the pair of conductor layers; and a narrow wall which is a post wall composed of a plurality of conductor posts which are arranged in a fence-like manner.

The post wall partitioning any two adjacent ones of the plurality of resonators has a portion in which the conductor posts are absent so that a coupling window is provided. The two adjacent resonators are electromagnetically coupled together via the coupling window. Some filter devices can be composed of a first-stage resonator which is provided with an input port and a last-stage resonator which is provided with an output port, and other filter devices can be composed of the first-stage resonator, the last-stage resonator, and one or more resonators provided between the first-stage and last-stage resonators. Thus, such a filter device in which a PWW is used is a resonator-coupled filter device.

The filter device disclosed in FIG. 1 and FIG. 4 of Patent Literature 1 is a five-pole filter device composed of five (five-stage) resonators. All of the resonators of the filter device are cylindrical. In addition, the five-stage resonators are disposed in a loop shape such that the first-stage resonator and the last-stage resonator are adjacent to each other. The filter device further includes a control post which is made of a conductor and is disposed on or near a side wall of each of the resonators. A change in position of the control post makes it possible to change a resonance frequency of a corresponding resonator without changing a basic design of the filter device.

Main design parameters of such a resonator-coupled filter device include (i) respective areas of the resonators seen in plan view and (ii) a coefficient of coupling between the resonators (i.e., the size of a coupling window). This is because the resonance frequency of each of the resonators (i.e., a center frequency in a passband of a filter device) depends on the area of a corresponding resonator, and the bandwidth of the passband depends on the coefficient of coupling between the resonators.

CITATION LIST

Patent Literature

Patent Literature 1

Japanese Patent Publication No. 6312910

SUMMARY OF INVENTION

Technical Problem

The resonator-coupled filter device as described above has various coefficients of coupling between the resonators, i.e., various sizes of coupling windows, in order to obtain desired transmission characteristics.

For example, for a resonator-coupled filter device which includes five resonators $R_1$ to $R_5$ and in which the first-stage resonator $R_1$ is coupled to an input waveguide $R_8$ and the fifth-stage resonator $R_5$ is coupled to an output waveguide $R_9$, the respective sizes of coupling windows decrease in the following order: (1) a coupling window coupling the input waveguide $R_5$ and the resonator $R_1$ and a coupling window coupling the resonator $R_5$ and the output waveguide $R_9$, (2) a coupling window coupling the resonator $R_1$ and the resonator $R_2$ and a coupling window coupling the resonator $R_4$ and the resonator $R_5$, (3) a coupling window coupling the resonator $R_2$ and the resonator $R_3$ and a coupling window coupling the resonator $R_3$ and the resonator $R_4$.

The sizes of the coupling windows influence resonance frequencies, which are determined in accordance with respective effective areas of the resonators $R_1$ to $R_5$ in plan view, and change the effective areas from respective design values for areas of the resonators. Specifically, a coupling window which has a larger size causes a resonator to have an effective area larger than the design value for the area of the resonator. Therefore, assuming that the resonators $R_1$ to $R_5$ share with each other the same design value for the areas of the resonators, the effective areas decrease in the following order: (1) the resonators $R_1$ and $R_5$, (2) the resonators $R_2$ and $R_4$, (3) the resonator $R_3$.

In order to bring the respective effective areas of the resonators $R_1$ to $R_5$ closer to uniformity, it is necessary to make the design values for the respective areas of the resonators $R_1$ to $R_5$ different among (1) the resonators $R_1$ and $R_5$, (2) the resonators $R_2$ and $R_4$, and (3) the resonator $R_3$. In addition, causing the resonators $R_1$ to $R_5$ to have respective different areas affects the sizes of the coupling windows. This makes it necessary to redesign the respective sizes of the coupling windows. Such a process for designing the filter device is complicated because (i) the areas of the resonators $R_1$ to $R_5$ and (ii) the sizes of the coupling windows are required to be optimized while (i) and (ii) are mutually dependent.

A filter device in accordance with the present invention has been made in view of the above problems, and has an object to provide a filter device which can be designed by a simple design process.

Solution to Problem

In order to attain the object, a filter device in accordance with a first aspect of the present invention includes a post-wall waveguide functioning as a resonator group including n resonators $R_1, R_2, \ldots, R_n$ (n is an odd number not less than five) which are electromagnetically coupled together and which are congruent with each other. The resonators $R_1, R_2, \ldots, R_{(n-1)/2}$ are configured such that (1) each resonator $R_i$ ($i=1, 2, \ldots, (n-1)/2$) includes therein a control post $CP_i$ and (2) a shortest distance $d_i$ from the control post $CP_i$ to a narrow wall of the resonator $R_i$ satisfies $d_1>d_2> \ldots >d_{(n-1)/2}$. The resonators $R_{(n+1)/2+1}, R_{(n+1)/2+2}, \ldots, R_n$ are configured such that (1) each resonator $R_j$ ($j=(n+1)/2+1, (n+1)/2+2, \ldots, n$) includes therein a control post $CP_j$ and (2) a shortest distance $d_j$ from the control post $CP_j$ to a narrow wall of the resonator $R_j$ satisfies $d_{(n+1)/2+1} < d_{(n+1)/2+2} < \ldots < d_n$.

Advantageous Effects of Invention

It is possible to design a filter device in accordance with an aspect of the present invention by a design process simpler than conventional design processes.

DESCRIPTION OF EMBODIMENTS

First Embodiment (Structure of Filter Device)

Figure 1:
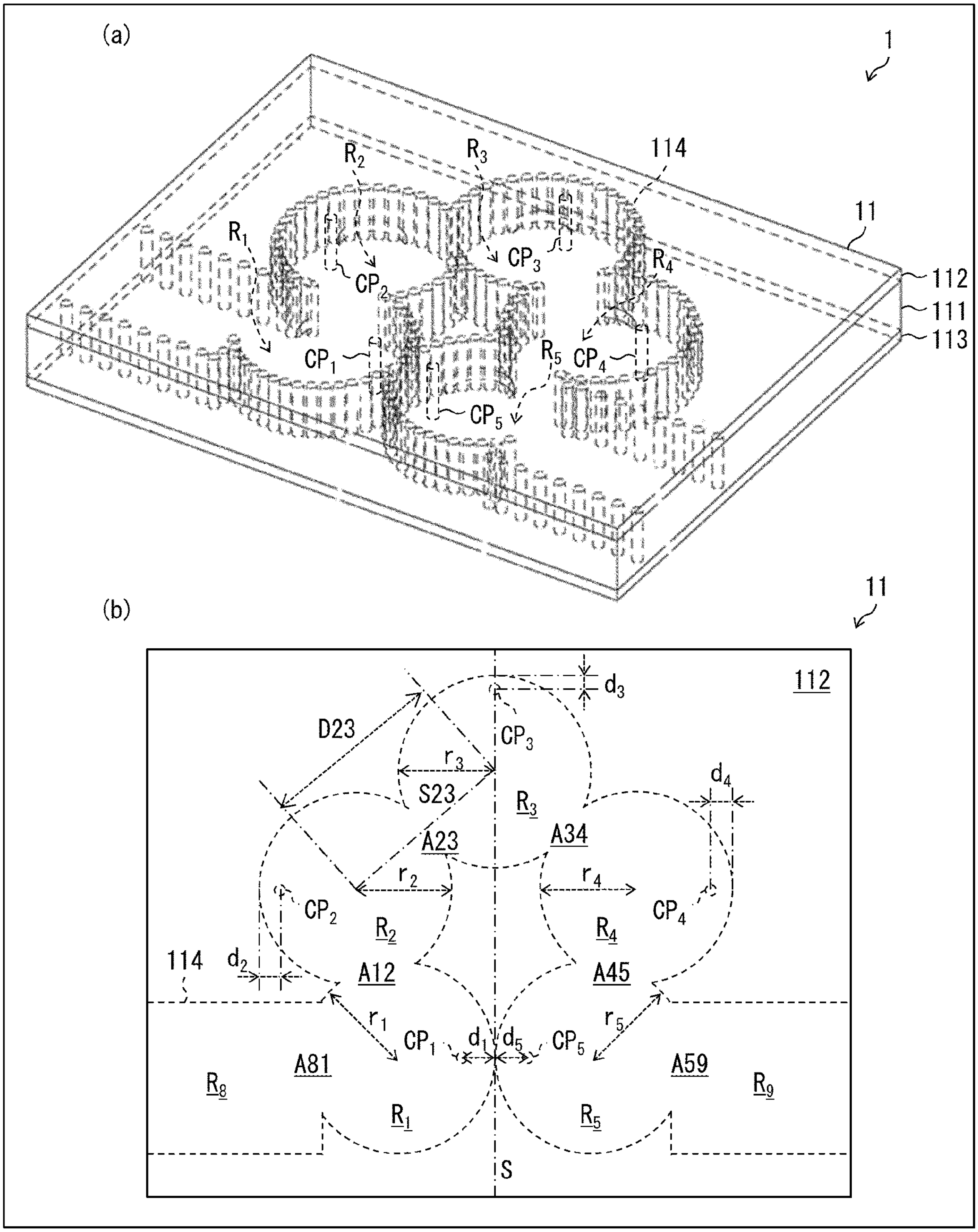
FIG. 1 is a view illustrating a filter device in accordance with a first embodiment of the present invention, in which (a) of FIG. 1 is a perspective view of the filter device and (b) of FIG. 1 is a plan view of a post-wall waveguide of the filter device illustrated in (a).

The following description will discuss, with reference to FIG. 1, a structure of a filter device 1 in accordance with a first embodiment of the present invention. (a) of FIG. 1 is a perspective view of the filter device 1. (b) of FIG. 1 is a plan view of a post-wall waveguide 11 of the filter device 1.

The filter device 1 includes the post-wall waveguide 11 which functions as a plurality of (n: n is any integer not less than 2) resonators $R_1$ to $R_n$ which are electromagnetically coupled together. The description of the first embodiment will discuss the case of n=5. In other words, the post-wall waveguide 11 functions as five resonators $R_1$ to $R_5$. The resonator $R_2$ is an example of a resonator $R_{(n-1)/2}$ recited in the claims, the resonator $R_3$ is an example of a resonator $R_{(n+1)/2}$ recited in the claims, the resonator $R_4$ is an example of a resonator $R_{(n+1)/2+1}$ recited in the claims, and the resonator $R_5$ is an example of a resonator $R_{(n+1)/2+2}$ recited in the claims. The resonators $R_1$ to $R_5$ which do not need to be particularly discriminated from each other are each hereinafter referred to as a resonator $R_x$.

The post-wall waveguide 11 includes a dielectric substrate 111, a first broad wall 112 provided on a first main surface (an upper surface in FIG. 1 and FIG. 2) of the dielectric substrate 111, a second broad wall 113 provided on a second main surface (a lower surface in FIG. 1 and FIG. 2) of the dielectric substrate 111, and a post wall 114 provided inside the dielectric substrate 111.

The dielectric substrate 111 is a plate-like member made of a dielectric material. The first embodiment employs quartz glass as the dielectric material of which the dielectric substrate 111 is made. In this case, the dielectric substrate 111 can have a thickness of, for example, 860 μm.

The first broad wall 112 and the second broad wall 113 are layered (filmy) members which are made of a conductor material. The first embodiment employs copper as the conductor material of which the first broad wall 112 and the second broad wall 113 are made.

The post wall 114 is a collection of conductor posts which short-circuit the first broad wall 112 and the second broad wall 113 and which are arranged in a fence-like manner, and serves as a narrow wall of the post-wall waveguide 11. The conductor posts constituting the post wall 114 are disposed at intervals sufficiently shorter than a wavelength of an electromagnetic wave received by the post-wall waveguide 11. Thus, the post wall 114 serves as a conductor wall for the electromagnetic waves. The conductor posts can have a diameter of, for example, 100 μm, and an interval between the central axes of adjacent conductor posts can be set to, for example, 200 μm. In the first embodiment, the conductor posts constituting the post wall 114 are each produced by forming a conductor layer on the inner wall of a through-hole passing through the dielectric substrate 111 or by filling the through-hole with a conductor. A pattern in which the post wall 114 is disposed is determined so that a space bounded by the first broad wall 112, the second broad wall 113, and the post wall 114 functions as the plurality of resonators $R_1$ to $R_5$ which are electromagnetically coupled together. The pattern in which the post wall 114 is disposed will be described later with reference to another drawing.

The first embodiment employs quartz glass as the dielectric material of which the dielectric substrate 111 of the post-wall waveguide 11 is made. However, an aspect of the present invention is not limited to this. The dielectric material of which the dielectric substrate 111 of the post-wall waveguide 11 is made can be any dielectric material different from quartz, such as, sapphire or alumina.

The first embodiment employs copper as the conductor material of which the first broad wall 112 and the second broad wall 113 of the post-wall waveguide 11 are made. However, an aspect of the present invention is not limited to this. The conductor material of which the first broad wall 112 and the second broad wall 113 of the post-wall waveguide 11 are made can be any conductor material different from copper, such as aluminum or an alloy composed of a plurality of metallic elements.

Each resonator $R_x$ is cylindrical in the first embodiment. However, an aspect of the present invention is not limited to this. The resonator $R_x$ can have the shape of, for example, a prism whose cross section (cross section parallel to the main surfaces of the dielectric substrate 111) is a regular polygon which has at least six vertexes. When the resonator Rx is cylindrical, a circumscribed circle of the resonator Rx in plan view coincides with the outer edge of the broad walls of the resonator Rx. This makes it possible to use either the radius of the resonator Rx or the radius of the circumscribed circle of the resonator Rx to define a center-to-center distance between any two adjacent ones of the resonators. When the resonator Rx has a cross section which is not a circle but a regular polygon that has at least six vertexes, it is possible to use the radius of the circumscribed circle of the resonator Rx to define the center-to-center distance.

The number n of the resonators $R_1$ to $R_n$ is five in the first embodiment. However, an aspect of the present invention is not limited to this. Specifically, the number n can be any number not less than two. The number n, which is an odd number in the first embodiment, can be an even number as described later.

(Pattern in which post wall is disposed)

The following description will discuss, with reference to (b) of FIG. 1, the pattern in which the post wall 114 is disposed in the post-wall waveguide 11. (b) of FIG. 1 is a plan view of the post-wall waveguide 11. In (b) of FIG. 1, the post wall 114 is illustrated, with a dotted line, as an imaginary conductor wall. The dotted line is obtained by connecting, by arcs or straight lines, the respective centers of the conductor posts constituting the post wall 114.

The pattern in which the post wall 114 is disposed is determined so that a space bounded by the first broad wall 112, the second broad wall 113, and the post wall 114 includes the components below.

the input waveguide $R_8$, the resonator $R_1$ electromagnetically coupled to the input waveguide $R_8$ via a coupling window A81, the resonator $R_2$ electromagnetically coupled to the resonator $R_1$ via a coupling window A12, the resonator $R_3$ electromagnetically coupled to the resonator $R_2$ via a coupling window A23, the resonator $R_4$ electromagnetically coupled to the resonator $R_3$ via a coupling window A34, the resonator $R_5$ electromagnetically coupled to the resonator $R_4$ via a coupling window A45, and the output waveguide $R_9$ electromagnetically coupled to the resonator $R_5$ via a coupling window A59.

Since n=5 in the first embodiment, it is determined that i, j, and (n+1)/2 each recited in the claims are i=1, 2, j=4, 5, and (n+1)/2=3, respectively. The resonator $R_1$ and the resonator $R_5$ are examples of a first-stage resonator and a last-stage resonator, respectively, each recited in the claims.

The resonators $R_1$ to $R_5$ are cylindrical and congruent with each other. In other words, the resonators $R_1$ to $R_5$ have respective radii $r_1$ to $r_5$ each of which is a radius $r_a$, which is shared among the resonators $R_1$ to $R_5$. The input waveguide $R_8$ and the output waveguide $R_9$ have the shape of a rectangular parallelepiped. The center-to-center distance between two adjacent resonators (for example, the resonator $R_2$ and the resonator $R_3$) is smaller than the sum of the radii of the two resonators. For example, a center-to-center distance D23 between the two adjacent resonators $R_2$ and $R_3$ satisfies $D23<r_2+r_3$ ($=2r_a$). This causes the two adjacent resonators to be electromagnetically coupled to each other via a coupling window. For example, the two adjacent resonators $R_2$ and $R_3$ are electromagnetically coupled to each other via the coupling window A23.

Two adjacent resonators are symmetric with respect to a plane containing the central axes of the two resonators. For example, the two adjacent resonators $R_2$ and $R_3$ are symmetric with respect to a plane S23 (see (b) of FIG. 1) containing the central axes of the two resonators $R_2$ and $R_3$. In addition, the resonator group composed of the resonators $R_1$ to $R_5$ is symmetric with respect to a particular plane S (see (b) of FIG. 1) which is orthogonal to the first broad wall 112. It is possible to easily design the filter device 1 by giving such symmetries to the post wall 114 so as to reduce independent parameters which define the pattern in which the post wall 114 is disposed.

Further, the resonator $R_1$ coupled to the input waveguide $R_8$ and the resonator $R_5$ coupled to the output waveguide $R_9$ are disposed so as to be adjacent to each other. Thus, the resonators $R_1$ to $R_5$ as a whole are arranged so as to have a loop shape. Such an arrangement enables the dielectric substrate 111 in which the post wall 114 is provided to be more compact. This allows the dielectric substrate 111 to have a smaller magnitude of thermal expansion or thermal contraction which may be caused when an ambient temperature changes. It is therefore possible to reduce a change in characteristics of the filter device 1 which may be caused by the thermal expansion or contraction of the dielectric substrate 111 when the ambient temperature changes.

In the first embodiment, a waveguide coupled to the resonator $R_1$ is the input waveguide $R_8$, and a waveguide coupled to the resonator $R_5$ is the output waveguide $R_9$. However, an aspect of the present invention is not limited to this. Alternatively, the waveguide coupled to the resonator $R_1$ can be the output waveguide, and the waveguide coupled to the resonator $R_5$ can be an input waveguide.

(Control Post)

As illustrated in (a) and (b) of FIG. 1, the resonator $R_1$ includes therein a control post $CP_1$, the resonator $R_2$ includes therein a control post $CP_2$, the resonator $R_3$ includes therein a control post $CP_3$, the resonator $R_4$ includes therein a control post $CP_4$, and the resonator $R_5$ includes therein a control post $CP_5$. As in the case of the resonator $R_x$, the control posts $CP_1$ to $CP_5$ which do not need to be particularly discriminated from each other are each referred to as a control post $CP_x$.

Each control post $CP_x$ is similar in configuration to the conductor posts constituting the post wall 114. The control post $CP_x$ has a diameter of, for example, 100 μm.

Assuming that a shortest distance from the control post $CP_1$ to a narrow wall of the resonator $R_1$ is a shortest distance $d_1$, a shortest distance from the control post $CP_2$ to a narrow wall of the resonator $R_2$ is a shortest distance $d_2$, a shortest distance from the control post $CP_3$ to a narrow wall of the resonator $R_3$ is a shortest distance $d_3$, a shortest distance from the control post $CP_4$ to a narrow wall of the resonator $R_4$ is a shortest distance $d_4$, and a shortest distance from the control post $CP_5$ to a narrow wall of the resonator $R_5$ is a shortest distance $d_5$, the shortest distances $d_1$, $d_2$ satisfy $d_1>d_2$, and the shortest distances $d_4$, $d_5$ satisfy $d_4<d_5$. Further, the shortest distance $d_3$ satisfies $d_2>d_3$ and $d_3<d_4$.

Note that the description of the first embodiment discusses the case of employing n=5 as the number n of the resonators as illustrated in FIG. 1. When the number n of the resonators is generalized, the filter device 1 can be described as including the post-wall waveguide functioning as a resonator group including n resonators $R_1, R_2, \ldots, R_n$ (n is an odd number not less than five) which are electromagnetically coupled together and which are congruent with each other, the resonators $R_1, R_2, \ldots, R_{(n-1)/2}$ being configured such that (1) the resonator $R_i$ ($i=1, 2, \ldots, (n-1)/2$) includes therein a control post $CP_i$ and (2) a shortest distance $d_i$ from the control post $CP_i$ to a narrow wall of the resonator $R_i$ satisfies $d_1>d_2> \ldots >d_{(n-1)/2}$, the resonators $R_{(n+1)/2+1}, R_{(n+1)/2+2}, \ldots, R_n$ being configured such that (1) the resonator $R_j$ ($j=(n+1)/2+1, (n+1)/2+2, \ldots, n$) includes therein a control post $CP_j$ and (2) a shortest distance $d_j$ from the control post $CP_j$ to a narrow wall of the resonator $R_j$ satisfies $d_{(n+1)/2+1}<d_{(n+1)/2+2}< \ldots <d_n$.

Further, in the filter device 1, the resonator $R_{(n+1)/2}$ includes therein a control post $CP_{(n+1)/2}$, and a shortest distance $d_{(n+1)/2}$ from the control post $CP_{(n+1)/2}$ to a narrow wall of the resonator $R_{(n+1)/2}$ satisfies $d_{(n-1)/2}>d_{(n+1)/2}$ and $d_{(n+1)/2}<d_{(n+1)/2+1}$.

The description of the filter device 1 of the first embodiment discusses the case where the resonator $R_3$, which is an example of the resonator $R_{(n+1)/2}$, includes therein the control post $CP_3$. However, the control post $CP_3$ can be omitted when the respective resonance frequencies of the resonators $R_1$, $R_2$, $R_4$, and $R_5$ do not need to be adjusted in accordance with the resonance frequency corresponding to an effective area of the resonator $R_3$ which is determined on the basis of (i) the area which the resonator $R_3$ has when it is designed and (ii) the sizes of the coupling windows A23, A34.

As illustrated in (b) of FIG. 1, each control post $CP_k$ (k=1, 2, . . . , 5) is preferably disposed at a position which does not block the coupling window for electromagnetically coupling the resonator $R_k$ to the resonator $R_{k-1}$ or the resonator $R_{k+1}$.

Since the resonator $R_x$ is cylindrical in the first embodiment, the position which does not block the coupling window can be described as follows. Specifically, in a case where, for example, the resonator $R_2$ is seen in plan view, the position which does not block the coupling windows A12 and A23 is a position in fan-shaped regions which form a part of the circular resonator $R_2$ and which are outside fan-shaped regions whose chords are the coupling windows A12 and A23.

[Group of Variations]

(First and Second Variations)

Figure 2:
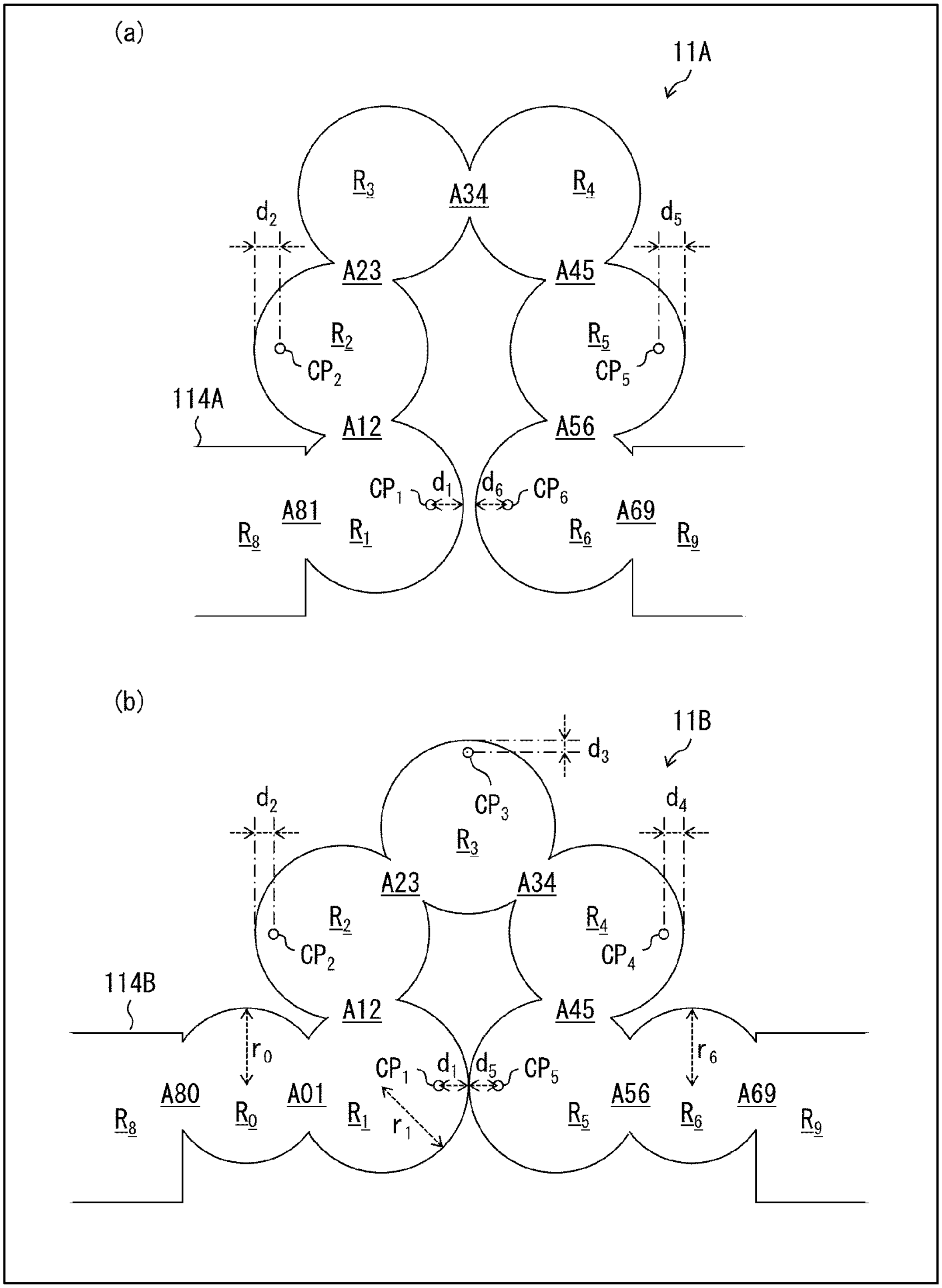
FIG. 2 is a view illustrating first and second variations of the post-wall waveguide illustrated in FIG. 1, in which (a) of FIG. 2 is a plan view schematically illustrating the first variation and (b) of FIG. 2 is a plan view schematically illustrating the second variation.

The following description will discuss, with reference to FIG. 2, a post-wall waveguide 11A and a post-wall waveguide 11B which are a first variation and a second variation, respectively, of the post-wall waveguide 11. (a) of FIG. 2 is a plan view schematically illustrating the post-wall waveguide 11A. (b) of FIG. 2 is a plan view schematically illustrating the post-wall waveguide 11B. Of the components of the post-wall waveguide 11A, (a) of FIG. 2 does not illustrate the dielectric substrate 111, the first broad wall 112, and the second broad wall 113 but schematically illustrates only a post wall 114A with a solid line. The post wall 114A corresponds to the post wall 114 of the post-wall waveguide 11. Note that the solid line is obtained by connecting, by arcs or straight lines, the respective centers of the conductor posts constituting the post wall 114A. Similarly, (b) of FIG. 2 schematically illustrates only a post wall 114B with a solid line.

The post-wall waveguide 11A functions as six (n=6) resonators $R_1$ to $R_6$, an input waveguide $R_8$, and an output waveguide $R_9$. As illustrated in (a) of FIG. 2, a pattern in which the post wall 114A is disposed is determined so that a space bounded by the first broad wall 112, the second broad wall 113, and the post wall 114A includes the components below.

- the input waveguide $R_8$,
- a resonator $R_1$ electromagnetically coupled to the input waveguide $R_8$ via a coupling window A81,
- a resonator $R_2$ electromagnetically coupled to the resonator $R_1$ via a coupling window A12,
- a resonator $R_3$ electromagnetically coupled to the resonator $R_2$ via a coupling window A23,
- a resonator $R_4$ electromagnetically coupled to the resonator $R_3$ via a coupling window A34,
- a resonator $R_5$ electromagnetically coupled to the resonator $R_4$ via a coupling window A45,
- a resonator $R_6$ electromagnetically coupled to the resonator $R_5$ via a coupling window A56, and
- the output waveguide $R_9$ electromagnetically coupled to the resonator $R_6$ via a coupling window A69.

Further, the resonator $R_1$ includes therein a control post $CP_1$, the resonator $R_2$ includes therein a control post $CP_2$, the resonator $R_5$ includes therein a control post $CP_5$, and the resonator $R_6$ includes therein a control post $CP_6$. In other words, the resonators $R_3$ and $R_4$ do not include therein control posts $CP_3$ and $CP_4$, respectively.

Assuming that a shortest distance from the control post $CP_1$ to a narrow wall of the resonator $R_1$ is a shortest distance $d_1$, a shortest distance from the control post $CP_2$ to a narrow wall of the resonator $R_2$ is a shortest distance $d_2$, a shortest distance from the control post $CP_5$ to a narrow wall of the resonator $R_5$ is a shortest distance $d_5$, and a shortest distance from the control post $CP_6$ to a narrow wall of the resonator $R_6$ is a shortest distance $d_6$, the shortest distances $d_1$, $d_2$ satisfy $d_1>d_2$, and the shortest distances $d_5$, $d_6$ satisfy $d_5<d_6$.

Note that the description of the post-wall waveguide 11A discusses the case of employing n=6 as the number n of the resonators as described above. When the number n of the resonators is generalized, the filter device 1 including the post-wall waveguide 11A is described as including a post-wall waveguide functioning as a resonator group including n resonators $R_1, R_2, \ldots, R_n$ (n is an even number not less than six) which are electromagnetically coupled together and which are congruent with each other, the resonators $R_1, R_2, \ldots, R_{n/2-1}$ being configured such that (1) each resonator $R_i$ (i=1, 2, . . . , n/2−1) includes therein a control post $CP_i$ and (2) a shortest distance $d_i$ from the control post $CP_1$ to a narrow wall of the resonator $R_1$ satisfies $d_1>d_2> \ldots >d_{n/2-1}$, the resonators $R_{n/2+2}, R_{n/2+3}, \ldots, R_n$ being configured such that (1) each resonator $R_j$ (j=n/2+2, n/2+3, . . . , n) includes therein a control post $CP_j$ and (2) a shortest distance $d_j$ from the control post $CP_j$ to a narrow wall of the resonator $R_j$ satisfies $d_{n/2+2}<d_{n/2+3}< \ldots <d_n$.

In addition, the filter device 1 including the post-wall waveguide 11A can be configured such that the resonators $R_3$ and $R_4$ include therein control posts $CP_3$ and $CP_4$, respectively. In other words, the filter device 1 can be configured such that the resonator $R_{n/2}$ and the resonator $R_{n/2+1}$ include therein a control post $CP_{n/2}$ and a control post $CP_{n/2+1}$, respectively, and a shortest distance $d_{n/2}$ from the control post $CP_{n/2}$ to a narrow wall of the resonator $R_{n/2}$ satisfies $d_{n/2-1}>d_{n/2}$ and a shortest distance $d_{n/2+1}$ from the control post $CP_{n/2+1}$ to a narrow wall of the resonator $R_{n/2+1}$ satisfies $d_{n/2+1}<d_{n/2+2}$.

The post-wall waveguide 11B (see (b) of FIG. 2), which is based on the post-wall waveguide 11 illustrated in FIG. 1, is obtained by adding resonators $R_0$ and $R_6$ to the post-wall waveguide 11.

The resonator $R_0$ is followed by the resonator $R_1$ and has a smaller area than the resonator $R_1$ (and the resonators $R_2$ to $R_5$). The resonator $R_6$ follows the resonator $R_5$ and has a smaller area than the resonator $R_5$ (and the resonators $R_1$ to $R_4$). In other words, the resonator $R_0$ and the resonator $R_6$ have a radius $r_0$ and a radius $r_6$, respectively, each of which is less than a radius $r_1$ of the resonator $R_1$ (and the resonators $R_2$ to $R_5$). Neither the resonator $R_0$ nor the resonator $R_6$ includes therein any control post such as the control posts $CP_1$ to $CP_5$.

(Third to Fifth Variations)

Figure 3:
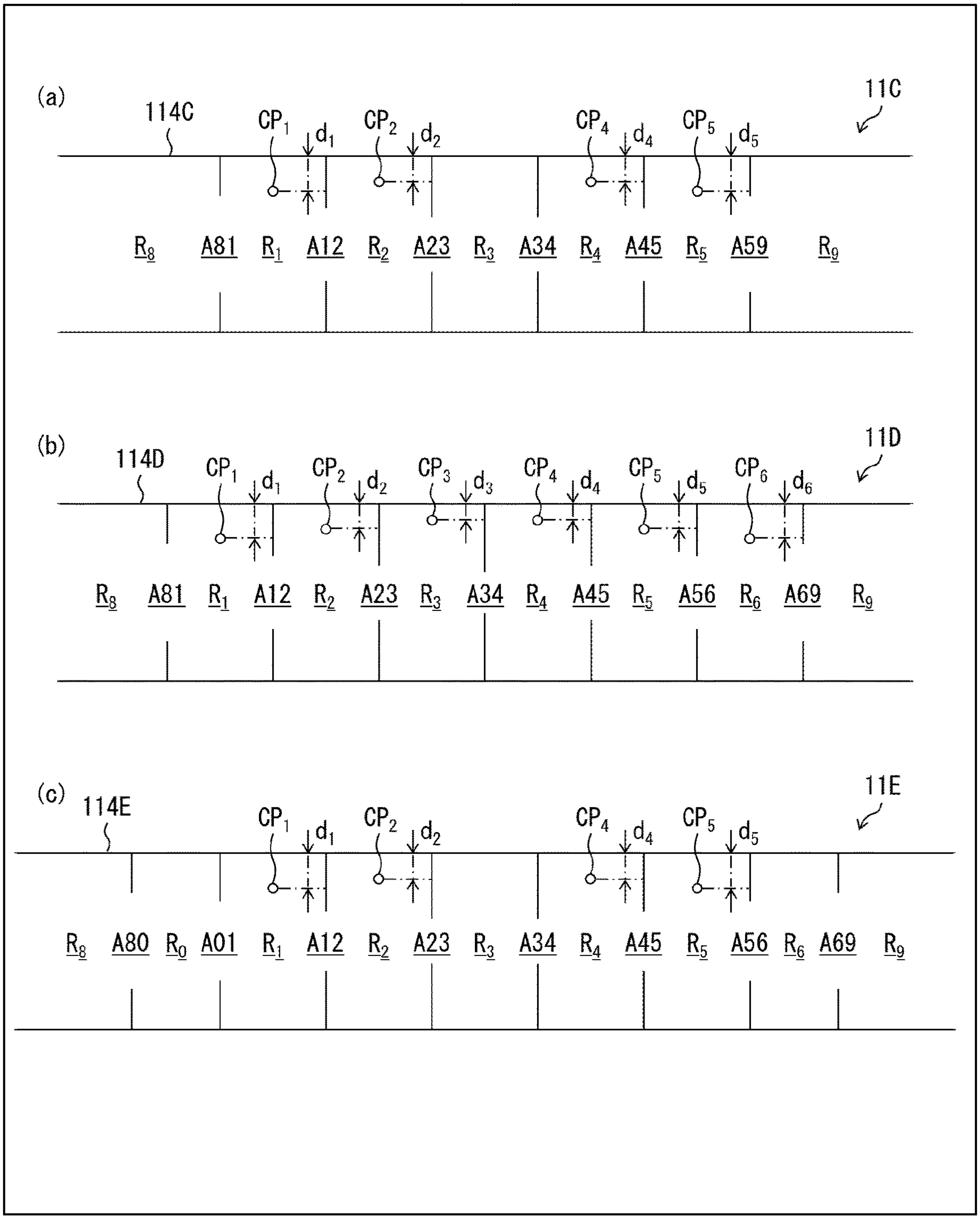
FIG. 3 is a view illustrating third, fourth, and fifth variations of the post-wall waveguide illustrated in FIG. 1, in which (a) of FIG. 3 is a plan view schematically illustrating the third variation, (b) of FIG. 3 is a plan view schematically illustrating the fourth variation, and (c) of FIG. 3 is a plan view schematically illustrating the fifth variation.

The following description will discuss, with reference to FIG. 3, a post-wall waveguide 11C, a post-wall waveguide 11D, and a post-wall waveguide 11E, which are a third variation, a fourth variation, and a fifth variation, respectively, of the post-wall waveguide 11. (a) of FIG. 3 is a plan view schematically illustrating the post-wall waveguide 11C. (b) of FIG. 3 is a plan view schematically illustrating the post-wall waveguide 11D. (c) of FIG. 3 is a plan view schematically illustrating the post-wall waveguide 11E. Of the components of the post-wall waveguide 11C, (a) of FIG. 3 does not illustrate the dielectric substrate 111, the first broad wall 112, and the second broad wall 113 but schematically illustrates only a post wall 114C with a solid line. The post wall 114C corresponds to the post wall 114 of the post-wall waveguide 11. Note that this solid line is obtained by connecting, by arcs or straight lines, the respective centers of conductor posts constituting the post wall 114C.

Similarly, (b) and (c) of FIG. 3 schematically illustrate only a post wall 114D and a post wall 114E with a solid line.

The resonators $R_1$ to $R_5$ of the post-wall waveguide 11 illustrated in FIG. 1 are each cylindrical. However, as illustrated in (a) to (c) of FIG. 3, resonators constituting the post-wall waveguide of a filter device in accordance with an aspect of the present invention can have the shape of a quadrangular prism having rectangular bases, and all of the resonators can be linearly disposed.

The post-wall waveguide 11C illustrated in (a) of FIG. 3 functions as five resonators $R_1$ to $R_5$, an input waveguide $R_8$, and an output waveguide $R_9$.

The resonator $R_1$ includes therein a control post $CP_1$, the resonator $R_2$ includes therein a control post $CP_2$, the resonator $R_4$ includes therein a control post $CP_4$, and the resonator $R_5$ includes therein a control post $CP_5$. In other words, the resonator $R_3$ does not include therein a control post $CP_3$.

A shortest distance $d_1$ from the control post $CP_1$ to a narrow wall of the resonator $R_1$ and a shortest distance $d_2$ from the control post $CP_2$ to a narrow wall of the resonator $R_2$ satisfy $d_1>d_2$. A shortest distance $d_4$ from the control post $CP_4$ to a narrow wall of the resonator $R_4$ and a shortest distance $d_5$ from the control post $CP_5$ to a narrow wall of the resonator $R_5$ satisfy $d_4<d_5$.

Alternatively, in the post-wall waveguide 11C, the resonator $R_3$ can include therein a control post $CP_3$. In this case, a shortest distance $d_3$ from the control post $CP_3$ to a narrow wall of the resonator $R_3$ satisfies $d_2>d_3$ and $d_3<d_4$.

As illustrated in (a) of FIG. 3, each control post $CP_k$ (k=1, 2, 4, 5) is preferably disposed at a position which does not block a coupling window for electromagnetically coupling the resonator $R_k$ to the resonator $R_{k-1}$ or the resonator $R_{k+1}$. This applies to the post-wall waveguide 11D (described later) and the post-wall waveguide 11E (described later).

Since each resonator $R_x$ has the shape of a quadrangular prism in the first embodiment, the position which does not block the coupling window can be described as follows. Specifically, in a case where, for example, the resonator $R_2$ is seen in plan view, the position which does not block coupling windows A12 and A23 is a position outside a trapezoidal region having a pair of bases which are the coupling windows A12 and A23.

The post-wall waveguide 11D illustrated in (b) of FIG. 3 functions as six resonators $R_1$ to $R_6$, an input waveguide $R_8$, and an output waveguide $R_9$.

The resonator $R_1$ includes therein a control post $CP_1$, the resonator $R_2$ includes therein a control post $CP_2$, the resonator $R_3$ includes therein a control post $CP_3$, the resonator $R_4$ includes therein a control post $CP_4$, the resonator $R_5$ includes therein a control post $CP_5$, and the resonator $R_6$ includes therein a control post $CP_6$.

A shortest distance $d_1$ from the control post $CP_1$ to a narrow wall of the resonator $R_1$ and a shortest distance $d_2$ from the control post $CP_2$ to a narrow wall of the resonator $R_2$ satisfy $d_1>d_2$. A shortest distance $d_5$ from the control post $CP_5$ to a narrow wall of the resonator $R_5$ and a shortest distance $d_6$ from the control post $CP_6$ to a narrow wall of the resonator $R_6$ satisfy $d_5<d_6$.

A shortest distance $d_3$ from the control post $CP_3$ to a narrow wall of the resonator $R_3$ satisfies $d_2>d_3$ and a shortest distance $d_4$ from the control post $CP_4$ to a narrow wall of the resonator $R_4$ satisfies $d_4<d_5$.

The post-wall waveguide 11E (see (c) of FIG. 3), which is based on the post-wall waveguide 11C illustrated in (a) of FIG. 3, is obtained by adding resonators $R_0$ and $R_6$ to the post-wall waveguide 11C.

The resonator $R_0$ is followed by the resonator $R_1$ and has a smaller area than the resonator $R_1$ (and the resonators $R_2$ to $R_5$). The resonator $R_6$ follows the resonator $R_5$ and has a smaller area than the resonator $R_5$ (and the resonators $R_1$ to $R_4$). Neither the resonator $R_0$ nor the resonator $R_6$ includes therein any control post such as the control posts $CP_1$ to $CP_5$.

Example

Figure 4:
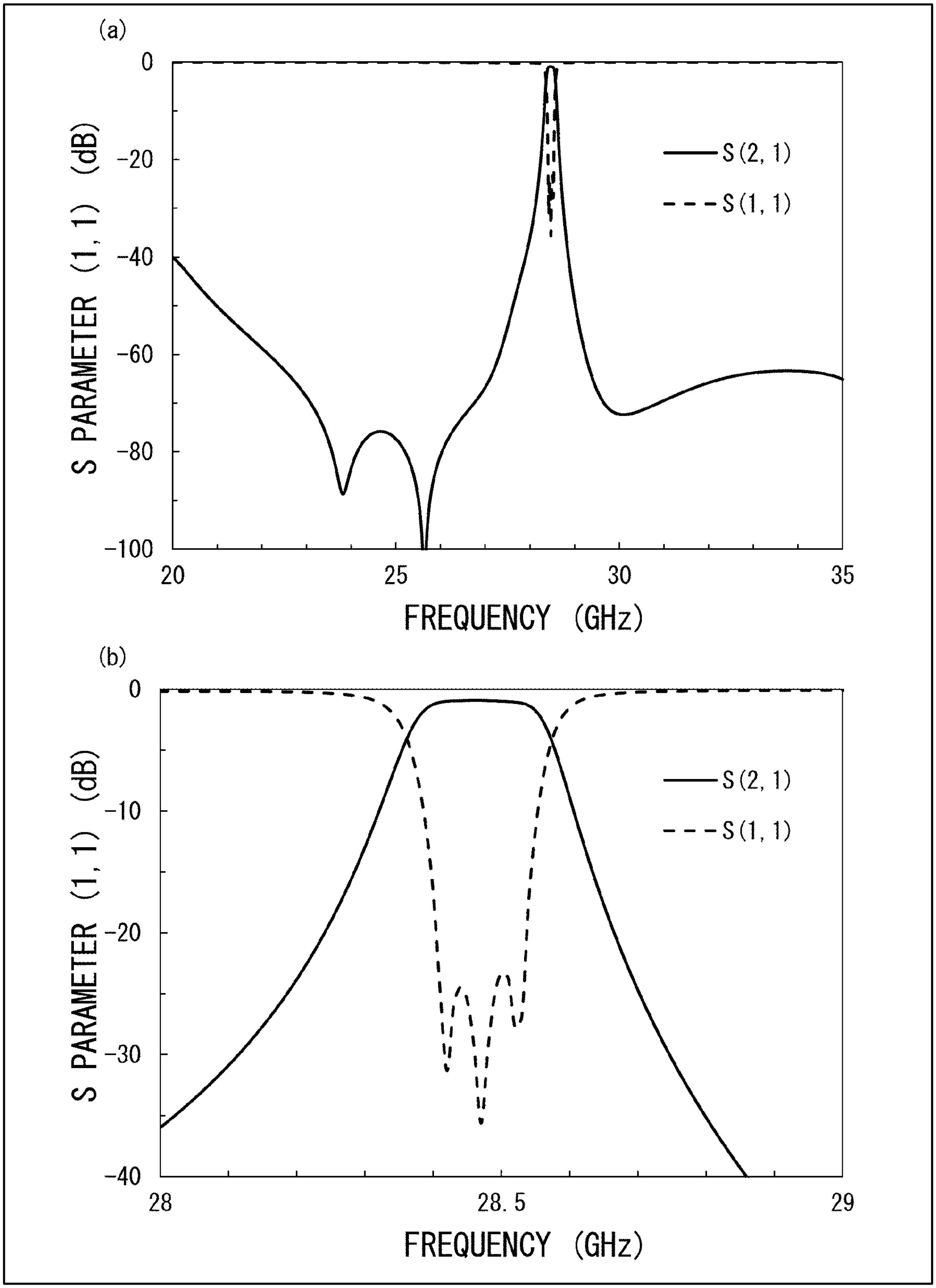
FIG. 4 is a view illustrating graphs, in which (a) of FIG. 4 is a graph illustrating characteristics of Example of the post-wall waveguide illustrated in FIG. 1 and (b) of FIG. 4 is an enlarged graph illustrating a portion of (a) of FIG. 4.

The following description will discuss, with reference to FIG. 4, characteristics of an Example of the post-wall waveguide 11 illustrated in FIG. 1. (a) of FIG. 4 is a graph showing characteristics of Example of the post-wall waveguide 11. (b) of FIG. 4 is a graph obtained by enlarging a part of (a) of FIG. 4.

In the present example, the thickness of the dielectric substrate 111 was set to 860 μm, a superconductor having a resistance of zero was employed as a material of which the first broad wall 112 and the second broad wall 113 are made, the radius $r_x$ of each resonator $R_x$ was set to $r_x$=2100 μm, the diameter of the control post $CP_x$ was set to 100 μm, and the shortest distances $d_1$, $d_2$, $d_3$, $d_4$, and $d_5$ were set as follows: $d_1=d_5$=825 μm, $d_2=d_4$=435 μm, and $d_3$=375 μm.

These design parameters were employed so that the configuration of the post-wall waveguide 11 would be used to provide a band pass filter the passband of which has a center frequency (i.e., the resonance frequency of the resonator $R_x$) of around 28 GHz and is ultra-narrow.

FIG. 4 illustrates the results of simulation of wavelength dependence of S parameters of the post-wall waveguide 11, which are S(1,1) and S(2,1). In the following description, the wavelength dependence of the S parameter S(1,1) is referred to as a reflection characteristic, and the wavelength dependence of the S parameter S(2,1) is referred to as a transmission characteristic.

(a) and (b) of FIG. 4 show the following: Given that the post-wall waveguide 11 of the present example has a passband which is a band in which the S parameter S(2,1) exceeds −5 dB, that passband has a center frequency of 28.46 GHz and a bandwidth of 0.21 GHz. In other words, the post-wall waveguide 11 of the present example is found to provide an ultra-narrow-band band pass filter which is so favorable as to have a fractional bandwidth of 0.7% and a reflection characteristic of not more than −20 dB.

In order to provide such an ultra-narrow-band band pass filter, it is necessary to precisely control a coefficient of coupling between adjacent resonators. For example, in the case of a post-wall waveguide in which the control posts $CP_1$, $CP_2$, $CP_3$, $CP_4$, and $CP_5$ are omitted from the respective resonators $R_1$, $R_2$, $R_3$, $R_4$, and $R_5$ which constitute the post-wall waveguide 11, (i) respective areas of the resonators $R_1$, $R_2$, $R_3$, $R_4$, and $R_5$ and (ii) respective sizes of the coupling windows A12, A23, A34, and A45 are required to be precisely optimized while (i) and (ii) are mutually dependent. However, such a task is very complicated and difficult.

In the process for designing the post-wall waveguide 11, (i) the respective areas of the resonators $R_1$ to $R_5$ and (ii) the respective sizes of the coupling windows are not required to be precisely optimized while (i) and (ii) are mutually dependent. It is therefore possible to also design an ultra-narrow-band band pass filter by a simple design process.

Aspects of the present invention can also be expressed as follows:

A filter device of a first aspect of the present invention includes a post-wall waveguide functioning as a resonator group including n resonators $R_1$, $R_2$, . . . , $R_n$ (n is an odd number not less than five) which are electromagnetically coupled together and which are congruent with each other. The resonator $R_1$, $R_2$, . . . , $R_{(n-1)/2}$ are configured such that (1) each resonator $R_i$ (i=1, 2, . . . , (n−1)/2) includes therein a control post $CP_i$ and (2) a shortest distance $d_i$ from the control post $CP_i$ to a narrow wall of the resonator $R_i$ satisfies $d_1>d_2> . . . >d_{(n-1)/2}$. The resonators $R_{(n+1)/2+1}$, $R_{(n+1)/2+2}$, . . . , $R_n$ are configured such that (1) each resonator $R_j$ (j=(n+1)/2+1, (n+1)/2+2, . . . , n) includes therein a control post $CP_j$ and (2) a shortest distance $d_j$ from the control post $CP_j$ to a narrow wall of the resonator $R_j$ satisfies $d_{(n+1)/2+1}<d_{(n+1)/2+2}< . . . <d_n$.

With the above configuration, it is possible to cause the resonators $R_1$ to $R_n$ other than the resonator $R_{(n+1)/2}$ to each have an effective area closer to an effective area of the resonator $R_{(n+1)/2}$ by changing the shortest distance $d_i$ from the control post $CP_i$ to the narrow wall of the resonator $R_i$ after determining, on the basis of a design theory, areas of the n congruent resonators $R_1$ to $R_n$ and sizes of coupling windows each of which is for coupling two adjacent ones of the resonators. This eliminates optimizing, in the design process of the filter device in accordance with the first aspect, (i) the areas of the resonators $R_1$ to $R_n$ and (ii) the respective sizes of the coupling windows, while (i) and (ii) are mutually dependent, and thus makes it possible to design the filter device by a simple design process.

In particular, in a case of designing a band pass filter of an ultra-narrow band, a conventional filter device requires precisely optimizing the respective areas of the resonators $R_1$ to $R_n$ and the respective sizes of the coupling windows, while the areas and the sizes are mutually dependent. In contrast, the filter device in accordance with the first aspect does not require, in the design process thereof, optimizing (i) the areas of the resonators $R_1$ to $R_n$ and (ii) the respective sizes of the coupling windows, while (i) and (ii) are mutually dependent. It is therefore possible to also design an ultra-narrow-band filter device in accordance with the first aspect by a simple design process.

In a second aspect of the present invention, a filter device is configured such that, in the first aspect, the resonator $R_{(n+1)/2}$ includes therein a control post $CP_{(n+n)/2}$, and a shortest distance $d_{(n+1)/2}$ from the control post $CP_{(n+1)/2}$ to the resonator $R_{(n+1)/2}$ satisfies $d_{(n-1)/2}>d_{(n+1)/2}$ and $d_{(n+1)/2}<d_{(n+1)/2+1}$.

With the above configuration, it is possible to change the resonance frequency of each of the resonators $R_1$ to $R_n$(i.e., the center frequency of the passband of the filter device) without changing, of a plurality of design parameters, the design parameters other than a position of the control post $CP_1$, i.e., the areas of the resonators $R_1$ to $R_n$ and the respective sizes of the coupling windows. It is therefore possible to design a filter device having desired characteristics by a design process still simpler than conventional design processes.

To solve the above problems, a filter device in accordance with a third aspect of the present invention includes a post-wall waveguide functioning as a resonator group including n resonators $R_1$, $R_2$, . . . , $R_n$ (n is an even number not less than six) which are electromagnetically coupled together and which are congruent with each other. The resonator $R_1$, $R_2$, . . . , $R_{n/2-1}$ are configured such that (1) each resonator $R_i$ (i=1, 2, . . . , n/2−1) includes therein a control post $CP_i$ and (2) a shortest distance $d_i$ from the control post $CP_i$ to a narrow wall of the resonator $R_i$ satisfies $d_1>d_2> . . . >d_{n/2-1}$. The resonator $R_{n/2+2}$, $R_{n/2+3}$, . . . , $R_n$ are configured such that (1) each resonator $R_j$ (j=n/2+2, n/2+3, . . . , n) includes therein a control post $CP_j$ and (2) a shortest distance $d_j$ from the control post $CP_j$ to a narrow wall of the resonator $R_j$ satisfies $d_{n/2+2}<d_{n/2+3}< . . . <d_n$.

With the above configuration, it is possible to cause the resonators $R_1$ to $R_n$ other than the resonator $R_{n/2}$ and the resonator $R_{n/2+1}$ to have an effective area closer to an effective area of the resonator $R_{n/2}$ and the resonator $R_{n/2+1}$ by changing the shortest distance $d_i$ from the control post $CP_1$ to a narrow wall of the resonator $R_i$ after determining, on the basis of a design theory, areas of the n congruent resonators $R_1$ to $R_n$ and sizes of the coupling windows each of which is for coupling two adjacent ones of the resonators. This eliminates optimizing, in the design process of the filter device in accordance with the third aspect, (i) the areas of the resonators $R_1$ to $R_n$ and (ii) the respective sizes of the coupling windows, while (i) and (ii) are mutually dependent, and thus makes it possible to design the filter device by a simple design process.

In a fourth aspect of the present invention, a filter device is configured such that, in the third aspect, the resonator $R_{n/2}$ and the resonator $R_{n/2+1}$ include therein a control post $CP_{n/2}$ and a control post $CP_{n/2+1}$, respectively. A shortest distance $d_{n/2}$ from the control post $CP_{n/2}$ to the resonator $R_{n/2}$ satisfies $d_{n/2-1}>d_{n/2}$ and a shortest distance $d_{n/2+1}$ from the control post $CP_{n/2+1}$ to the resonator $R_{n/2+1}$ satisfies $d_{n/2+2}>d_{n/2+1}$.

With the above configuration, it is possible to change the resonance frequency of each of the resonators $R_1$ to $R_n$(i.e., the center frequency of a passband of the filter device) without changing, of the plurality of design parameters, the design parameters other than a position of the control post $CP_1$, i.e., without changing the areas of the resonators $R_1$ to $R_n$ and the respective sizes of the coupling windows. It is therefore possible to make a design process for a filter device having desired characteristics still simpler than conventional design processes.

In a fifth aspect of the present invention, a filter device is configured such that, in any one of the first to fourth aspects, the resonator group further includes: a resonator $R_0$ which is followed by the resonator $R_1$ and which has a smaller area than the resonator $R_1$; and a resonator $R_{n+1}$ which follows the resonator $R_n$ and which has a smaller area than the resonator $R_n$.

A filter device in accordance with an aspect of the present invention can include the resonator $R_0$ and the resonator $R_{n+1}$ as in the fifth aspect.

In a sixth aspect of the present invention, a filter device is configured such that, in any one of the first to fifth aspects, the control post $CP_k$ (k=1, 2, . . . , n) is disposed at a position which does not block a coupling window for electromagnetically coupling the resonator $R_k$ to the resonator $R_{k-1}$ or the resonator $R_{k+1}$.

With the above configuration, it is possible to dispose each control post $CP_k$ in a manner that reduces the influence on electromagnetic coupling between the resonator $R_k$ and the resonator $R_{k-1}$ or between the resonator $R_k$ and the resonator $R_{k+1}$.

In a seventh aspect of the present invention, a filter device is configured such that, in any one of the first to sixth aspects, all of the resonators constituting the resonator group have a cylindrical shape or a shape of a prism whose bases have a shape of a regular polygon which has at least six vertexes. Of all of the resonators, two resonators coupled together are disposed in plan view in a manner that satisfies $D<2r_a$, where $r_a$ is a radius of a circumscribed circle of each of the two resonators and D is a center-to-center distance between the two resonators.

With the above configuration, when a focus is placed on two resonators which are included in the n resonators $R_1$ to $R_n$ and which are coupled together, the circumscribed circle of each of the two resonators is symmetric with respect to a straight line which connects the centers of the two circumscribed circles. This enables the filter device in accordance with the seventh aspect to have increased symmetries in terms of the shape of the filter device and thus enables a reduction in the number of design parameters.

In an eighth aspect of the present invention, a filter device is configured such that, in the seventh aspect, of all of the resonators, a first-stage resonator is coupled to an input waveguide, and a last-stage resonator is coupled to an output waveguide, and the first-stage resonator and the last-stage resonator are disposed so as to be adjacent to each other A post-wall waveguide is often soldered onto a substrate on which a device such as a high-frequency device is mounted. In a case where a material for the populated substrate and a material for a substrate included in the post-wall waveguide are different from each other, a stress acts on the soldered portion due to the difference in linear expansion coefficient between the material for the populated substrate and the material for the substrate of the post-wall waveguide. When the stress is large, a crack may occur in the soldered portion.

With the above configuration, it is possible to make smaller a maximum width of the post-wall waveguide than with a configuration of n linearly disposed resonators $R_1$ to $R_n$. For example, a post-wall waveguide in which the resonators $R_1$ to $R_n$ are linearly disposed has, in plan view, a shape of a rectangle composed of a pair of shorter sides and a pair of longer sides. In contrast, according to the filter device in accordance with the eighth aspect, it is possible to shorten a pair of longer sides. This makes it possible to reduce, the stress which acts on the soldered portion in the filter device in accordance with the eighth aspect, as compared to a filter device having linearly disposed resonators $R_1$ to $R_n$, and thus reduce the possibility of a crack occurring in the soldered portion.

In a ninth aspect of the present invention, a filter device is configured such that, in any one of the first to sixth aspects, all of the resonators constituting the resonator group are cylindrical and are linearly disposed.

In a tenth aspect of the present invention, a filter device is configured such that, in any one of the first to sixth aspects, all of the resonators constituting the resonator group (i) have a shape of a quadrangular prism having rectangular bases and (ii) are linearly disposed.

The ninth and tenth aspects, which have simple configuration of n resonators $R_1$ to $R_n$, make it possible to design a filter device having desired characteristics by a design process still simpler than conventional design processes.

[Additional Remark]

The present invention is not limited to the first embodiment described herein, but can be altered by a skilled person in the art within the scope of the claims. An embodiment derived from a proper combination of technical means each disclosed in a different embodiment is also encompassed in the technical scope of the present invention.

REFERENCE SIGNS LIST

1: Filter device
11, 11A, 11B, 11C, 11D, 11E: Post-wall waveguide
111: Dielectric substrate
112: First broad wall
113: Second broad wall
114: Post wall
$R_0$, $R_1$, $R_2$, $R_3$, $R_4$, $R_5$, $R_6$: Resonator
$R_8$: Input waveguide
$R_9$: Output waveguide
A80, A01, A81, A12, A23, A34, A45, A56, A59, A69: Coupling window
$CP_1$, $CP_2$, $CP_3$, $CP_4$, $CP_5$, $CP_6$: Control post

The invention claimed is:

1. A filter device comprising a post-wall waveguide functioning as a resonator group including n resonators $R_1, R_2, \ldots, R_n$ (n is an odd number not less than five) which are electromagnetically coupled together and which are congruent with each other, the resonators $R_1, R_2, \ldots, R_{(n-1)/2}$ being configured such that (1) each resonator $R_i$ ($i=1, 2, \ldots, (n-1)/2$) includes therein a control post $CP_i$ and (2) a shortest distance $d_i$ from the control post $CP_i$ to a narrow wall of the resonator $R_i$ satisfies $d_1>d_2> \ldots >d_{(n-1)/2}$, the resonators $R_{(n+1)/2+1}, R_{(n+1)/2+2}, \ldots, R_n$ being configured such that (1) each resonator $R_j$ ($j=(n+1)/2+1, (n+1)/2+2, \ldots, n$) includes therein a control post $CP_j$ and (2) a shortest distance $d_j$ from the control post $CP_j$ to a narrow wall of the resonator $R_j$ satisfies $d_{(n+1)/2+1}<d_{(n+1)/2+2}< \ldots <d_n$.

2. The filter device according to claim 1, wherein the resonator $R_{(n+1)/2}$ includes therein a control post $CP_{(n+1)/2}$, and a shortest distance $d_{(n+1)/2}$ from the control post $CP_{(n+1)/2}$ to the resonator $R_{(n+1)/2}$ satisfies $d_{(n-1)/2}>d_{(n+1)/2}$ and $d_{(n+1)/2}<d_{(n+1)/2+1}$.

3. The filter device according to claim 1, wherein the resonator group further includes: a resonator $R_0$ which is followed by the resonator $R_1$ and which has a smaller area than the resonator $R_1$; and a resonator $R_{n+1}$ which follows the resonator $R_n$ and which has a smaller area than the resonator $R_n$.

4. The filter device according to claim 1, wherein the control post $CP_k$ ($k=1, 2, \ldots, n$) is disposed at a position which does not block a coupling window for electromagnetically coupling the resonator $R_k$ to the resonator $R_{k-1}$ or the resonator $R_{k+1}$.

5. The filter device according to claim 1, wherein all of the resonators constituting the resonator group have a cylindrical shape or a shape of a prism whose bases have a shape of a regular polygon which has at least six vertexes, and of all of the resonators, two resonators coupled together are disposed in plan view in a manner that satisfies $D<2r_a$, where $r_a$ is a radius of a circumscribed circle of each of the two resonators, and D is a center-to-center distance between the two resonators.

6. The filter device according to claim 5, wherein of all of the resonators, a first-stage resonator is coupled to an input waveguide, and a last-stage resonator is coupled to an output waveguide, and the first-stage resonator and the last-stage resonator are disposed so as to be adjacent to each other.

7. The filter device according to claim 1, wherein all of the resonators constituting the resonator group are cylindrical and linearly disposed.

8. The filter device according to claim 1, wherein all of the resonators constituting the resonator group (i) have a shape of a quadrangular prism having rectangular bases and (ii) are linearly disposed.

9. A filter device comprising a post-wall waveguide functioning as a resonator group including n resonators $R_1, R_2, \ldots, R_n$ (n is an even number not less than six) which are electromagnetically coupled together and which are congruent with each other, the resonators $R_1$, $R_2$, . . . , $R_{n/2-1}$ being configured such that (1) each resonator $R_i$ (i=1, 2, . . . , n/2−1) includes therein a control post $CP_i$ and (2) a shortest distance $d_i$ from the control post $CP_i$ to a narrow wall of the resonator $R_i$ satisfies $d_1>d_2> \ldots >d_{n/2-1}$, the resonators $R_{n/2+2}$, $R_{n/2+3}$, . . . , $R_n$ being configured such that (1) each resonator $R_j$ (j=n/2+2, n/2+3, . . . , n) includes therein a control post $CP_j$ and (2) a shortest distance $d_j$ from the control post $CP_j$ to a narrow wall of the resonator $R_j$ satisfies $d_{n/2+2}<d_{n/2+3}< \ldots <d_n$.

10. The filter device according to claim 9, wherein the resonator $R_{n/2}$ and the resonator $R_{n/2+1}$ include therein a control post $CP_{n/2}$ and a control post $CP_{n/2+1}$, respectively, and a shortest distance $d_{n/2}$ from the control post $CP_{n/2}$ to the resonator $R_{n/2}$ satisfies $d_{n/2-1}>d_{n/2}$, and a shortest distance $d_{n/2+1}$ from the control post $CP_{n/2+1}$ to the resonator $R_{n/2+1}$ satisfies $d_{n/2+2}>d_{n/2+1}$.

11. The filter device according to claim 9, wherein the resonator group further includes: a resonator $R_0$ which is followed by the resonator $R_1$ and which has a smaller area than the resonator $R_1$; and a resonator $R_{n+1}$ which follows the resonator $R_n$ and which has a smaller area than the resonator $R_n$.

12. The filter device according to claim 9, wherein the control post $CP_k$ (k=1, 2, . . . , n) is disposed at a position which does not block a coupling window for electromagnetically coupling the resonator $R_k$ to the resonator $R_{k-1}$ or the resonator $R_{k+1}$.

13. The filter device according to claim 9, wherein all of the resonators constituting the resonator group have a cylindrical shape or a shape of a prism whose bases have a shape of a regular polygon which has at least six vertexes, and of all of the resonators, two resonators coupled together are disposed in plan view in a manner that satisfies $D<2r_a$, where $r_a$ is a radius of a circumscribed circle of each of the two resonators, and D is a center-to-center distance between the two resonators.

14. The filter device according to claim 9, wherein all of the resonators constituting the resonator group are cylindrical and linearly disposed.

15. The filter device according to claim 9, wherein all of the resonators constituting the resonator group (i) have a shape of a quadrangular prism having rectangular bases and (ii) are linearly disposed.

* * * * *